Figure 1:
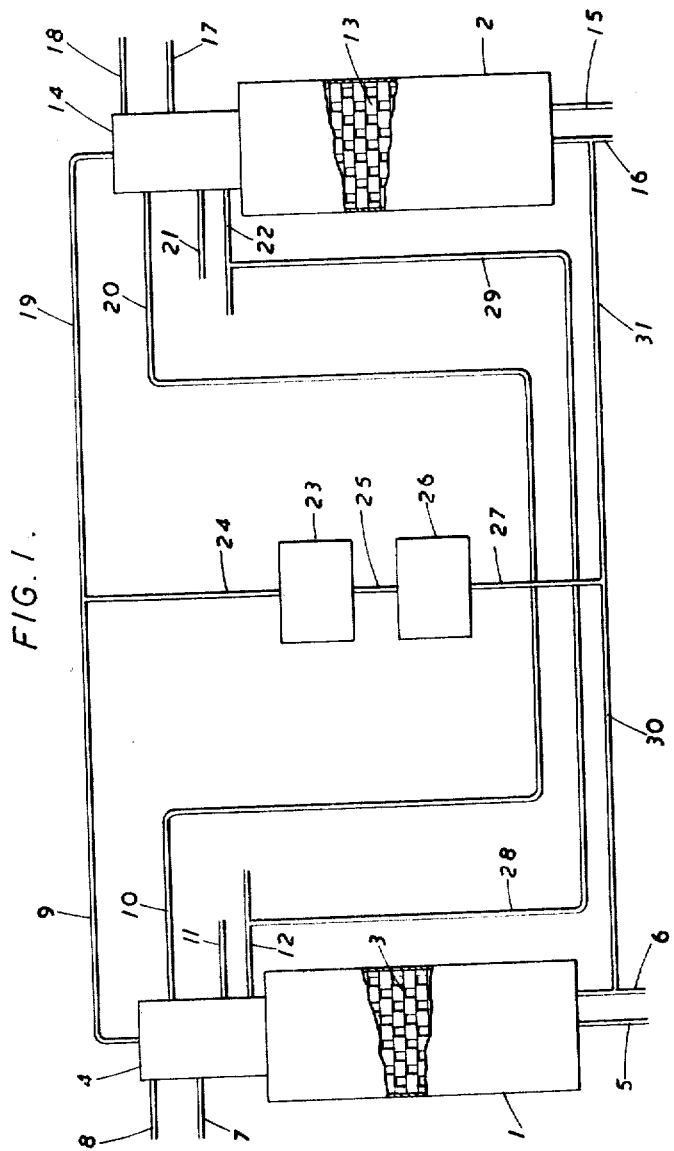

Nov. 16, 1954 M. STEINSCHLAEGER 2,694,621
PROCESS FOR THE MANUFACTURE OF CARBON BLACK
Filed Oct. 12, 1948 2 Sheets-Sheet 1

Inventor
MICHAEL STEINSCHLAEGER
By
Young, Emery & Thompson
Attorneys

Nov. 16, 1954 — M. STEINSCHLAEGER — 2,694,621
PROCESS FOR THE MANUFACTURE OF CARBON BLACK

Filed Oct. 12, 1948 — 2 Sheets-Sheet 2

Inventor
MICHAEL STEINSCHLAEGER
By Young, Emery & Thompson
Attorneys

2,694,621

PROCESS FOR THE MANUFACTURE OF CARBON BLACK

Michael Steinschlaeger, London, England

Application October 12, 1948, Serial No. 54,090

Claims priority, application Great Britain October 17, 1947

2 Claims. (Cl. 23—209.4)

This invention relates to a process for the manufacture of carbon black from liquid, gaseous or solid carbonaceous materials, which expression as used herein means hydrocarbons, oxygen-containing derivatives of hydrocarbons, nitrogen-containing derivatives of hydrocarbons, animal or vegetable oils, fats and waxes and natural resins.

Numerous proposals have been made for the manufacture of carbon black from hydrocarbon-containing materials. The best known of them producing high grade carbon blacks are:

1. Channel black processes;
2. Furnace black processes,
    (a) involving the incomplete combustion of hydrocarbon-containing material such as oil, tars, hydrocarbon gases and pitches;
    (b) involving the use of hot gases obtained by the combustion of fuels and to crack hydrocarbon-containing material;
3. Modification of the channel black and furnace black processes.

The processes at present in use, however, suffer from the drawback of low thermal efficiency if a high quality carbon black is required, and also require a high capital expenditure and involve high operation and raw material costs.

My investigations have shown the reason for the low efficiency of converting carbonaceous materials into carbon black by the above processes to be as follows:

The primary reaction which takes place in the manufacture of carbon black may be expressed as follows:

(1)  $C_nH_x = nC + xH \pm Y$ cals./kgm. of carbon wherein $n$ and $x$ are integers and Y is the reaction heat required which varies according to the carbonaceous material used. Thus, for example, for paraffin hydrocarbons such as gas oil the reaction heat is negative and for aromatic hydrocarbons such as anthracene is positive. In addition heat is required to heat the carbonaceous material to the cracking temperature and to provide for heat losses.

Should it be possible to crack the carbonaceous material according to the primary reaction practically complete conversion of the carbon in the material used into carbon black could be effected and a considerable proportion of hydrogen obtained.

However, it is found that according to the process used one or more secondary reactions are also proceeding in addition to the main reaction (1) and these may be expressed as follows:

(2)  $C + CO_2 = 2CO - 3490$ cals. per kgm. of carbon
(3)  $C + H_2O = CO + H_2 - 2636$ cals. per kgm. of carbon
(4)  $C + 2H_2 = CH_4 + 1506$ cals. per kgm. of carbon
(5)  $C + \frac{1}{2}O = CO + 2440$ cals. per kgm. of carbon
(6)  $C + O_2 = CO_2 + 8080$ cals. per kgm. of carbon
(7)  $H_2 + \frac{1}{2}O_2 = H_2O + 28570$ cals. per kgm. of carbon Some of these reactions are required to generate the heat used for heating the carbonaceous material to the cracking temperature; to provide the heat required for the cracking reaction (if any); to provide the heat required for the other secondary reactions and, finally, to provide the heat to cover the losses.

It is obvious that the secondary reactions consume according to the process in use and the quality of carbon black required a large proportion of the carbon available (e. g. in the channel process up to 96–97%) and require in some processes a considerable amount of heat.

From the above it can be seen that if it were possible to suppress the whole or a part or some of the secondary reactions or to turn them to some effective use in the process, a considerably higher efficiency of the conversion could be obtained.

In addition, the quality of the carbon black would be considerably improved, because the carbon consumed in secondary reactions is the most active carbon.

Reaction 2 may be suppressed by using gases free from carbon dioxide or containing only a small proportion of carbon dioxide calculated on the carbonaceous material under treatment. Thus the proportion of the carbonaceous material under treatment which is converted into carbon monoxide by reaction with carbon dioxide according to Reaction 2 should be kept to a minimum, preferably not more than 10% by weight. This can be ensured either by keeping the proportion of carbon dioxide present low and/or by keeping the proportion of treatment gas to carbonaceous material low.

It has been found that besides all other side reactions the water gas reaction $C + H_2O = CO + H_2(3)$ does not occur, which can be explained, firstly, owing to the high concentration of hydrogen in the gases obtained, and, secondly, owing to the high velocity or short time of contact required to produce high quality carbon black according to the process of the present invention.

The extent to which Reaction 4 takes place depends upon the temperature of the reaction zone and the time the reaction products or reactants are in the reaction zone in the sense that the higher is the temperature the lower is the amount of methane formed and as the reaction is exothermic and only a small proportion of carbon is consumed the suppression of this reaction is not so important and in any case it increases the calorific value of the gas obtained.

Furthermore, it is obvious that Reaction 2 will take place in preference to Reactions 3 and 4 at high temperatures as the Reaction 2 requires less heat.

Reactions 5, 6 and 7 may be suppressed by using gases free from oxygen or containing only a small proportion of oxygen. But, as explained hereinafter, it is sometimes desirable to have oxygen present in the gas, but this difficulty can be overcome by selecting the proportion of oxygen in accordance with the proportion of hydrogen formed so that the Reactions 5 and 6 are eliminated and Reaction 7 is only disadvantageous in that it produces steam which may tend to favour Reaction 3 but is explained hereinbefore. Reaction 3 may be kept to a minimum by using a short time of contact between the gas and the carbonaceous material.

The present invention provides a process for the manufacture of carbon black which overcomes the aforesaid drawbacks which comprises mixing a hot gas with a carbonaceous material (as hereinbefore defined) so that the contact time is less than five seconds, the sensible heat and the temperature of said gas being sufficiently high to heat the carbonaceous material, provide for heat losses and crack the carbonaceous material and the temperature and composition of the gas and the proportion of the gas to the carbonaceous material in conjunction with the aforesaid contact time being such as to ensure that the cracking is effected substantially only according to the reaction:

$C_nH_x = nC + xH \pm Y$ cals./kgm. of carbon wherein $n$ and $x$ are integers and Y is the reaction heat required.

The contact time is preferably less than 0.5 second and the temperature is preferably between 800° C. and 1400° C., the particular temperature employed depending upon the contact time and the quality of the carbon black required.

According to one embodiment of the invention the hot gas is obtained by burning a fuel with an oxygen-containing gas. Preferably the fuel is a hydrogen-containing gas and a part of the gas obtained in the cracking is recycled and burnt to provide further hot gas. The combustion gas preferably contains oxygen. This is effected by using an excess of oxygen or air in the combustion so that when the combustion gas is mixed in the correct proportion with the carbonaceous material the hydrogen produced by the cracking reacts preferentially with oxygen rather than with the carbon whereby the output of carbon black is increased. The proportion of oxygen in the combustion gas may be adjusted according to the hydrogen content of the carbonaceous material employed.

According to a second embodiment of the invention a process is provided for the manufacture of carbon black which comprises passing a gas through a heated vessel containing checker bricks (i. e. a regenerator) to heat the gas, mixing the gas leaving said vessel with a carbonaceous material (as hereinbefore defined) so that the contact time is less than five seconds, the sensible heat and the temperature of the said gas being sufficiently high to heat the carbonaceous material, provide for heat losses and crack the carbonaceous material and the temperature and composition of the gas and the proportion of the gas to the carbonaceous material in conjunction with the aforesaid contact time being such as to ensure that the cracking is effected substantially only according to the reaction:

$$C_nH_x = nC + xH \pm Y \text{ cals./kgm. of carbon}$$

wherein $n$ and $x$ are integers and $Y$ is the reaction heat required.

The hot gas leaving the vessel may be mixed with an oxygen-containing gas and the mixture partially burnt to increase the temperature thereof before mixing with the carbonaceous material. Alternatively, the hot gas leaving the vessel may be mixed with an oxygen-containing gas and the mixture burnt to increase the temperature thereof before mixing with the carbonaceous material, the proportion of oxygen-containing gas being such that sufficient heat is present to burn part of the hydrogen formed in the cracking.

The mixture obtained after cracking is cooled in any convenient manner, e. g. by water, steam or cold gases. The shorter the time during which the mixture remains at a high temperature the higher will be the quality of the carbon black obtained.

The gases with the entrained carbon black are brought after cooling directly or indirectly into an electrostatic precipitator, filters or cooled by water (the cooling may be accomplished in stages) and the carbon black precipitated.

The gases obtained in the process are used partly for heating the regenerators and partly recycled through the regenerators.

When employing the second embodiment preferably two regenerators are provided, one being heated while the other is used for heating the gas.

The mixing of the hot gases and the carbonaceous material may be effected in any convenient vessel which may be, for example, a pipe or a chamber.

In practical operation to start the plant hydrogen or steam can be used for the first cycles and then part of the gas obtained in the reaction and consisting largely of nitrogen and hydrogen is recycled after the composition of the gas is constant or after equilibrium is obtained or achieved.

The air, or a part of the air, required in the heating of the regenerator is advantageously brought through the pipe or chamber used as the reaction zone and serves to burn the carbon deposited (if any) in the pipe or chamber.

The gases obtained in the process are sufficient for heating, for recycling and according to the carbonaceous materials used a variable surplus is obtained which may be used for other purposes, e. g. for generation of power using gas turbines or in boilers for generation of steam.

The materials and gases used in the process may be pre-heated if required or desirable, and may assist in this way to increase the heat available for the reaction and for heating the carbonaceous material. The degree of pre-heating may be so regulated as to influence favourably the composition of the gas leaving the reaction zone so as to assist in suppressing Reactions 2 to 7.

Figure 2:
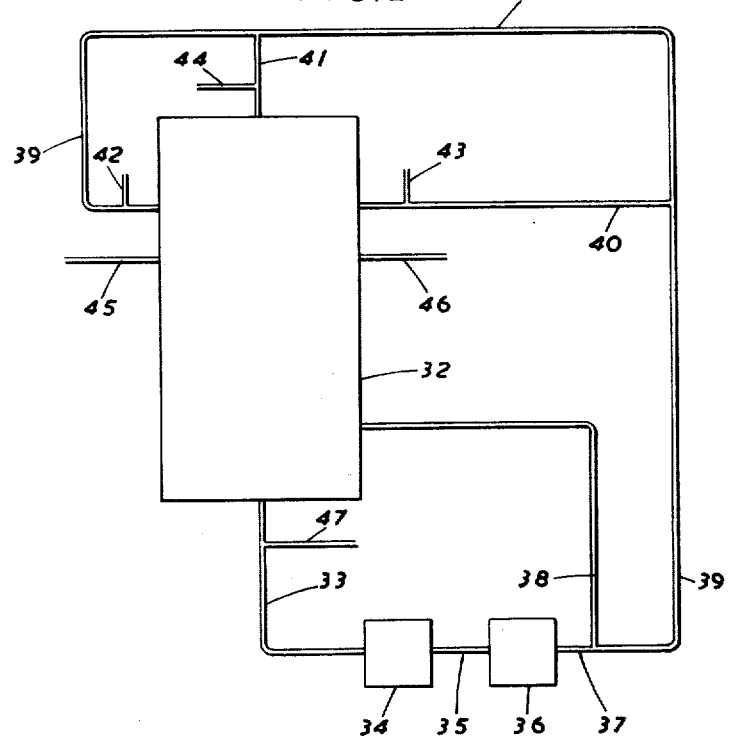
Figure 3:
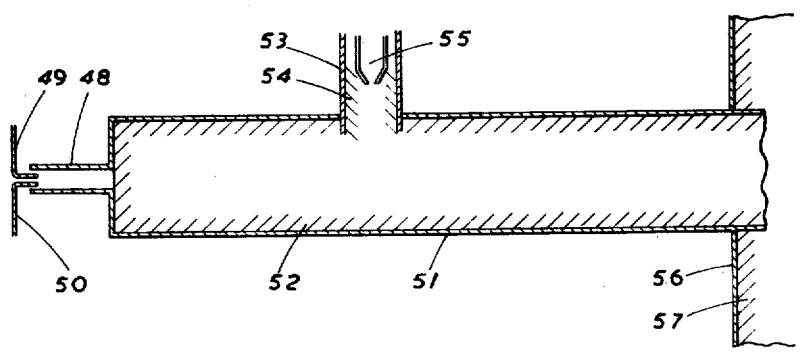

The invention will now be further described by way of example with reference to the accompanying drawings, in which:

Fig. 1 shows diagrammatically an apparatus for carrying out the process of the invention using two regenerators, Fig. 2 shows diagrammatically another apparatus not employing a regenerator, and Fig. 3 shows on an enlarged scale a modification of part of the apparatus of Figs. 1 and 2.

Referring to Fig. 1 of the drawings, the apparatus comprises two regenerators 1 and 2. The regenerator 1 contains checker bricks 3 and mounted on the top thereof is a reaction chamber 4. The regenerator 1 is provided with conduits 5 and 6 and the reaction chamber 4 is provided with conduits 7, 8, 9, 10, 11 and 12. The regenerator 2 which is similar to the regenerator 1 contains checker bricks 13 and mounted on the top thereof is a reaction chamber 14. The regenerator 2 is provided with conduits 15 and 16 and the reaction chamber 14 is provided with conduits 17, 18, 19, 20, 21 and 22. The apparatus also includes a carbon black precipitator 23 connected by a conduit 24 to conduits 9 and 19 and by a conduit 25 to a gas holder 26 having an outlet conduit 27. The conduit 27 is connected to the conduit 12 by a conduit 28 and to the conduit 22 by a conduit 29 and is also connected to the conduit 6 by a conduit 30 and to the conduit 16 by a conduit 31. It will be understood that all the conduits will be provided with control valves (not shown in the drawings).

The regenerators 1 and 2 are alternately heated and used for heating gases and the use of the apparatus shown in Fig. 1 will be described for the case in which regenerator 1 is being used for heating gases and regenerator 2 is being heated. Recycled gas mainly consisting of hydrogen and nitrogen is passed from the conduit 30 through the conduit 6 into the heated regenerator 1 and the heated gas passed into the reaction chamber 4 where it is partially burnt by means of air admitted through conduit 11 so that its temperature is increased whereafter it meets hydrocarbon-containing material, preferably a hydrocarbon oil or gas introduced through the conduit 7. The hydrocarbon-containing material is cracked and the products obtained are cooled by gas admitted through conduit 10 and the products then leave the reaction chamber through conduit 9 and pass through conduit 24 to the carbon black precipitator 23 where carbon black is separated and the gaseous products mainly consisting of hydrogen and nitrogen pass into conduit 27 where part is passed via conduit 10 to be used as cooling gas for the reaction chamber 4. Another part is recycled via conduit 30 and a third part is passed through conduit 29 to conduit 22 to be used as gas for burning to heat the regenerator 2. Simultaneously with the production of carbon black in reaction chamber 4 as above described, regenerator 2 is being heated as follows: Air is admitted through conduit 18 and gas or oil for burning as fuel through conduit 22 supplemented by recycled gas supplied through conduit 29. The hot gas produced heats the checker brickwork 13 and the waste gases leave through conduit 15. The air burns any carbon deposited in reaction chamber 14 from a previous operation. In starting up the apparatus gas to be heated may be supplied from outside the system through conduit 5. It will be understood that after the cycle described above the roles of the regenerators are reversed and in the next cycle regenerator 1 is heated and regenerator 2 is used for heating gases.

Referring to Fig. 2 of the drawings, the apparatus comprises a reaction chamber 32 connected by a conduit 33 to a carbon black precipitator 34 which in turn is connected by a conduit 35 to a gas holder 36 which has an outlet conduit 37. The conduit 37 has branch conduits 38, 39, 40 and 41, the last three of which have air supply conduits 42, 43 and 44 respectively connected thereto to form gas burners. Conduits 45 and 46 are provided for the introduction of hydrocarbon-containing material to be cracked. In addition a conduit 47 is provided for the admission of water or steam for cooling. It will be understood that all the conduits will be provided with control valves (not shown in the drawings).

In operation hot gas is produced by burning recycled gas mainly consisting of hydrogen and nitrogen supplied through conduits 39, 40 and 41 by air admitted through conduits 42, 43 and 44. The hot gas thus produced proceeds down the reaction chamber 32 and meets hydrocarbon-containing material, preferably a hydrocarbon oil or gas, admitted through conduits 45 and 46. The hydrocarbon-containing material is cracked and the products leave through conduit 33. They are cooled first by gas admitted through conduit 38 and then by water or steam admitted through conduit 44 and the carbon black is separated in the carbon black separator 34. The gases mainly consisting of hydrogen and nitrogen pass into the gas holder 36 and leave through outlet conduit 37 whence a part is recycled through conduits 39, 40 and 41 and a part is used for cooling the reaction products by introduction through conduit 38 into the reaction chamber 32.

To overcome the difficulty of introducing hydrocarbon-containing material into very hot gases the apparatus for effecting this mixture may take the form shown in Fig. 3 of the drawings. Referring to Fig. 3 of the drawings, the mixing apparatus comprises a burner 48 having a gas conduit 49 and air conduit 50. This burner leads into a tube 51 lined with a refractory ceramic mass or refractory monolithic mass 52. The tube 51 is provided with a side tube 53 similarly lined with a refractory mass 54 and containing an oil nozzle 55, the tube 51 leading into a reaction chamber 56 also having a similar refractory lining 57. In operation the gas and air admitted respectively through conduits 49 and 50 are burnt in the burner 48 and the combustion gases are mixed in the tube 51 with hydrocarbon oil or gas admitted through the nozzle 55, the mixture being rapidly transferred to the reaction chamber 56.

The following examples illustrate how the process of the invention may be carried into effect:

1. Tar oil containing 92% by weight of carbon and 6% by weight of hydrogen was cracked in the apparatus shown in Fig. 1 of the drawings. This composition is equivalent to 0.92 kgm. of carbon and 0.06 kgm. or 0.67 cubic metres of hydrogen per kgm. of material used. The reaction heat required to crack the material to carbon and hydrogen is 100 kgm. cals. per kgm. of oil. The specific heat of the tar oil was 0.55 kgm. cals. per kgm. at 1000° C. and the average temperature of the cracking reaction was 1000° C. The gases used for cracking were heated in the regenerator 1 to a temperature of 1700° C. The gases heated contained 40% by volume of hydrogen and 60% by volume of nitrogen and were supplied through conduit 30.

The following shows the heat required for cracking per kgm. of the tar oil:

|  | Kgm. cals. |
|---|---|
| Reaction heat | +100 |
| Heat required to heat the tar oil to 1000° C. | −550 |
| Losses in the plant | −100 |
|  | −550 |

Heat available in the hot gases leaving the regenerator at 1700° C.

| | |
|---|---|
| H₂, 0.40×1700×0.330 | 227 kgm. cals. |
| N₂, 0.60×1700×0.351 | 358 kgm. cals. |
| | 582 kgm. cals. per cubic metre. |

Heat in the gases leaving the reaction vessel at 1000° C.

| | |
|---|---|
| H₂, 0.40×1000×0.317 | 127 kgm. cals. |
| N₂ 0.60×1000×0.334 | 200 kgm. cals. |
| | 327 kgm. cals. per cubic metre. |

Therefore the heat available for cracking and heating the tar oil per cubic metre of gas is 582−327=255 kgm. cals. per cubic metre Therefore the amount of gas required to crack 1 kgm. of the tar oil is $$\frac{550}{255}$$

cubic metres, or approximately 2.2 cubic metres.

The composition of the gases leaving the reaction zone is as follows:

|  | Cubic metres |
|---|---|
| H₂ in the gases entering the reaction zone per kgm. of tar oil is 2.2×0.40 | 0.88 |
| H₂ formed per kgm. of tar oil | 0.67 |
| Total H₂ per kgm. | 1.55 |
| N₂ in the gases entering and leaving the reaction zone per kgm. of tar oil is 2.2×0.6 | 1.32 |

Therefore the total amount of gases leaving the reaction zone per kgm. of tar oil cracked is 2.87 cubic metres containing 54% by volume of hydrogen and 46% by volume of nitrogen (neglecting the nitrogen in the tar oil and other impurities such as sulphur and neglecting the formation of methane).

A part of the gas obtained is recycled through lines 10 and 28 and the remainder is used for heating the regenerator for the next cycle.

2. The process of Example 1 was modified by heating the gases in the regenerator to a temperature of 1200° C. and further heating them to 1700° C. by supplying air through conduit 11 to burn 10% by volume of the gas which contained 54% by volume of hydrogen and 46% by volume of nitrogen.

Therefore, for each cubic metre of gas 0.1 cubic metre of hydrogen was burnt with approximately 0.27 cubic metre of air.

The composition of the gas after combustion was 0.1 cubic metre of steam, 0.65 cubic metre of nitrogen and 0.44 cubic metre of hydrogen, or 1.19 cubic metres obtained from 1 cubic metre of gas.

The sensible heat at 1200° C. of the gas for the regenerator per cubic metre was:

|  | Kgm. cals. |
|---|---|
| H₂, 0.4×1200×0.321 | 154 |
| N₂, 0.6×1200×0.340 | 245 |
|  | 399 |

The sensible heat in 1.19 cubic metres of combustion gas at 1000° C. (temperature of reaction)

|  | Kgm. cals. |
|---|---|
| H₂O, 0.1×1000×0.410 | 41 |
| N₂, 0.65×1000×0.334 | 217 |
| H₂, 0.44×1000×0.317 | 139 |
|  | 397 |

The total heat in the gases used for the reaction per cubic metre of original gas is 399+0.1×2570=399+257=656 kgm. cals.

The heat available for cracking per cubic metre of gas is 656−397=259 kgm. cals., i. e. practically the same amount as in Example 1.

The composition of the gas entering the reaction zone after combustion (neglecting the steam formed) is as follows:

0.65 cubic metre of N₂+0.44 cubic metre of H₂ or approximately 40% H₂ and 60% N₂ by volume.

3. The same materials were used as in Example 1 and 2 with the differences noted below but the process was carried out in the apparatus shown in Fig. 2.

The composition of the recycle gas was 45% H₂ and 55% N₂ by volume. The air and gas were heated to 350° C. The tar oil was pre-heated so that instead of 550 kgm. cals. only 420 kgm. cals. per kgm. were required.

The gas was completely burned and the sensible heat obtained was used to crack the tar oil but suppressing Reactions 2 to 7 hereinbefore referred to.

The heat in the gases entering the reaction zone was as follows:

|  | Kgm. cals. |
|---|---|
| Potential heat (45% H₂) per cubic metre | 1155 |
| Sensible heat of the air 1.08×350×0.315 | 119 |
| Sensible heat of the gas 1×350×0.313 | 109 |
|  | 1383 |

Heat in the gases leaving the reaction zone:

|  | Kgm. cals. |
|---|---|
| H₂O, 0.45×1000×0.410 | 184 |
| N₂, 140×1000×0.334 | 466 |
|  | 650 |

Therefore the heat available for cracking was 1383−650=733 kgm. cals. Therefore one cubic metre of recycle gas can be used to crack $$\frac{733}{420}=1.74 \text{ kgm.}$$

of tar oil.

The composition of the gas leaving the reaction zone (neglecting the steam) is:

1.4 cubic metre of N₂+(1.74×0.17) cubic metre of H₂=1.4 cubic metre of N₂+1.17 cubic metre of H₂=2.62 cubic metres containing approximately 45.3% of H₂ and 54.7% of N₂ by volume or practically the same as the initial gas.

I claim:
1. The improvement in the manufacture of carbon black by thermal decomposition of hydrocarbons which comprises establishing a flow of a preheated mixture of hydrogen and nitrogen through an unobstructed reaction chamber, introducing air into said flow adjacent the entrance to said chamber in an amount sufficient to burn a minor portion of the hydrogen content of said mixture, and so regulating the preheating of said mixture and the amount of air introduced for burning the hydrogen to bring the resulting mixture of nitrogen, hydrogen and steam to a temperature of at least 1700° C., introducing hydrocarbons into said flow at a point adjacent but downstream from the point of introduction of the air and thereby causing thermal cracking thereof to elemental carbon and hydrogen at a temperature in the range 800–1400° C. and with a contact time of less than five seconds, and thereupon quickly cooling the decomposition products by introducing a cold mixture of nitrogen and hydrogen substantially free of oxides of carbon into the flow at a point adjacent but downstream from the point of introduction of said hydrocarbons to said flow.

2. The process for the manufacture of carbon black by thermal decomposition of hydrocarbons which comprises introducing a preheated gaseous fuel mixture of hydrogen and nitrogen substantially free of the oxides of carbon into an unobstructed reaction chamber, burning with air an amount of hydrogen contained in said gaseous fuel mixture sufficient to bring the resulting gaseous combustion mixture containing nitrogen and steam to a temperature of at least 1700° C.; contacting hydrocarbons with said resulting combustion mixture to thermally decompose said hydrocarbons at a temperature in the range 800–1400° C. and at a contact time of less than five seconds with the resulting production of carbon and hydrogen from said hydrocarbons; quenching the resulting decomposition products mixture with a relatively cold gaseous mixture of nitrogen and hydrogen substantially free of the oxides of carbon; recovering carbon black from the resulting cooled mixture and recycling a portion of the remaining gaseous mixture containing nitrogen and hydrogen and substantially free of the oxides of carbon as said gaseous fuel mixture and recycling a portion of said remaining gaseous mixture as said relatively cold gaseous mixture.

References Cited in the file of this patent
UNITED STATES PATENTS

| Number | Name | Date |
|---|---|---|
| 1,364,273 | Gerard et al. | Jan. 4, 1921 |
| 1,402,957 | Poindexter | Jan. 10, 1922 |
| 1,448,655 | Darrak | Mar. 13, 1923 |
| 1,669,618 | Lewis | May 15, 1928 |
| 1,804,249 | Day | May 5, 1931 |
| 1,987,643 | Spear et al. | Jan. 15, 1935 |
| 2,106,137 | Reed | Jan. 18, 1938 |
| 2,116,848 | Reed | May 10, 1938 |
| 2,163,630 | Reed | June 27, 1939 |
| 2,375,795 | Krejci | May 15, 1945 |
| 2,440,424 | Wiegand et al. | Apr. 27, 1948 |